United States Patent [19]

Chand

[11] Patent Number: 5,365,423
[45] Date of Patent: Nov. 15, 1994

[54] CONTROL SYSTEM FOR DISTRIBUTED SENSORS AND ACTUATORS

[75] Inventor: Sujeet Chand, Westlake Village, Calif.

[73] Assignee: Rockwell International Corporation, Seal Beach, Calif.

[21] Appl. No.: 818,008

[22] Filed: Jan. 8, 1992

[51] Int. Cl.$^5$ ............................................. G06F 15/46
[52] U.S. Cl. .................... 364/140; 364/468; 364/138
[58] Field of Search ............... 364/140, 141, 148, 164, 364/165, 138, 468, 149–151; 371/43; 395/2, 68

[56] References Cited

U.S. PATENT DOCUMENTS

| | | | |
|---|---|---|---|
| 4,562,529 | 12/1985 | Drummond | 364/140 |
| 4,620,286 | 10/1986 | Smith et al. | 364/134 X |
| 4,777,585 | 10/1988 | Kokawa | 364/164 X |
| 4,799,141 | 1/1989 | Drusinsky et al. | 364/141 |
| 4,885,757 | 12/1989 | Provence | 371/43 X |
| 4,977,599 | 10/1990 | Bahl et al. | 395/2 |
| 5,016,184 | 5/1991 | Gutjahr | 364/138 X |
| 5,157,595 | 10/1992 | Lovrenich | 364/141 X |
| 5,189,604 | 2/1993 | Lovrenich | 364/141 X |

FOREIGN PATENT DOCUMENTS 0325692 8/1989 European Pat. Off.
201356 7/1983 Germany.

OTHER PUBLICATIONS

Ramadge, P. J. et al, "The Control of Discrete Event Systems"; Proceedings of the IEEE, vol. 77 No. 1 Jan. 1989.

Chand, S.; "Robust Distributed Control In Discrete-Event Systems"; Proc. of the 29th Conference on Decision and Control; Dec. 1990.

Papoulis, Anthanasios; Probability, Random Variables, and Stochastic Processes; 1984; McGraw Hill Book Co.; New York pp. 385–403.

Primary Examiner—Roy N. Envall, Jr.
Assistant Examiner—Brian C. Oakes
Attorney, Agent, or Firm—John C. McFarren

[57] ABSTRACT

Conventional Boolean Logic Control is augmented to provide enhanced diagnostics, monitoring, and fail safe operation for dynamic systems having distributed discrete-valued sensors and actuators. A decentralized model of a controlled system defines behavior and timing models for both sensors and actuators, termed Control Elements (CEs). Each CE has a first model for transition from state 0 to 1, and a second model for transition from state 1 to 0. Each behavioral model is defined by an Event Signature comprising a sequence of state changes in neighboring CEs. A continuous evaluation of event signatures is performed to compute a probability that a given CE will change state. An Expectation Function is used to check and enforce the correct behavior of a CE. A statistical temporal model predicts delays in the states of a CE as a function of its previous and current delays. The distributed behavior and on-line timing models are used to detect and diagnose incorrect behavior and failures of decentralized sensors and actuators.

10 Claims, 1 Drawing Sheet

CONTROL SYSTEM FOR DISTRIBUTED SENSORS AND ACTUATORS

TECHNICAL FIELD

The present invention relates to control systems for dynamic processes and, in particular, to control systems for dynamic processes that utilize multiple decentralized sensors and actuators.

BACKGROUND OF THE INVENTION

Automated control of dynamic processes, such as in manufacturing plants, generally involves use of a multiplicity of discrete-valued sensors and actuators. In conventional control systems, Boolean logic is normally used for controlling actuators as a function of the state of one or more sensors. The control logic can be encoded into a Relay Ladder Diagram in a Programmable Logic Controller (PLC). In a Boolean Logic Control (BLC) system, the PLC scans the state of the sensors, evaluates predetermined Boolean equations based on the sensor states, and drives the actuators accordingly. Boolean Logic Control, however, does not contain any process state information. As a result, there is no explicit information on the sequential behavior of the process or the timing between state transitions of sensors and actuators. Therefore, Boolean logic controllers cannot detect and diagnose incorrect operation of the sensors and actuators, which frequently malfunction due to transient errors and failures.

An example of a typical BLC system is illustrated by the following Boolean equation:

$$A_1 = S_1 \cdot S_2 \cdot S_3$$

where "·" is the logical AND operator and $A_1$ is an actuator whose state is a logical function of the states of sensor $S_1$, $S_2$, and $S_3$. If $S_1=1$, $S_2=0$, and $S_3=1$, then the state of $A_1$ is 0. If $S_2$ incorrectly changes state from 0 to 1, then actuator $A_1$ also changes state from 0 to 1 (erroneously). Because BLC does not contain an explicit model of the process, such erroneous state transitions are difficult to detect, and they propagate through the logic causing incorrect operation of the actuators. This problem can be serious in a decentralized or distributed control system that has a large number of processing nodes.

Control methods based on state-machine models of a factory are also known in the prior art. These methods include process and logic description by Sequential Functions Charts, State Diagrams, or Function Blocks. Although these methods are superior to Relay Ladder Logic with respect to fail-safe control and diagnosis, they are only able to detect certain hard failures. They cannot detect transient errors and erroneous events within a state, and diagnostic routines must be explicitly programmed. Because these control systems contain their own state machines, they may not contain sufficient information about the process state or its relationship to other state machines for effective monitoring and diagnosis of distributed control systems. Therefore, an efficient method of on-line monitoring, diagnosis, and fail-safe operation has been sought for decentralized factory control systems that require multiple discrete sensors and actuators.

SUMMARY OF THE INVENTION

The present invention comprises a control method that augments Boolean Logic Control to provide enhanced diagnostics, monitoring, and fail safe operation for dynamic systems that have discrete-valued sensors and actuators. The method of the present invention is based on a decentralized model of the system to be controlled. Unlike conventional Boolean logic controllers, where logic is associated only with the actuators, the present method defines behavior and timing models for both sensors and actuators.

In the method of the present invention, each sensor and actuator, also referred to as Control Elements (CEs), has two models: a first model for transition from state 0 to 1, and a second model for transition from state 1 to 0. The behavior model is defined by a sequence of events in a CE's neighborhood. This sequence of events, called an Event Signature, comprises a sequence of state changes in neighboring CEs and encodes a subset of the process state into each CE. The method of the present invention performs a continuous evaluation of the event signatures to compute a measure of the likelihood that a CE will change state. This measure of likelihood, called an Expectation Function (EF), is used to check and enforce the correct behavior of a CE. Each CE also learns a statistical temporal model in real-time. The temporal model predicts delays in the states of the CE, as a function of its previous and current delays, in the evaluation of its event signature. The distributed behavior model and the on-line estimated timing model are used to detect and diagnose incorrect behavior and failures of sensors and actuators.

A principal object of the invention is the fail-safe operation and control of dynamic systems having discrete-valued sensors and actuators. A feature of the invention is the computation of a behavioral expectation function and a temporal model for each sensor and actuator. An advantage of the invention is the detection and diagnosis of incorrect behavior due to transient and hard failures of sensors and actuators in a distributed control system.

BRIEF DESCRIPTION OF THE DRAWINGS

For a more complete understanding of the present invention and for further advantages thereof, the following Detailed Description of the Preferred Embodiment makes reference to the accompanying Drawings, in which.

DETAILED DESCRIPTION OF THE PREFERRED EMBODIMENTS

Centralized process control is effective in checking and enforcing the correct evolution of a process because it includes a central repository of the system state. In contrast, a decentralized or distributed control system (DCS) is composed of multiple stand-alone controllers that autonomously control various subsystems of a larger process. A typical example of distributed control is a system in which a microprocessor is dedicated to each sensor and actuator, and in which the microprocessors are interconnected by a communication link. Although distributed control has the desirable characteristics of high performance and substantial fault-tolerance (because there is no single point of failure), a DCS can lose significant robustness because of the lack of a central repository of the system state. Since each Control Element (CE) of a DCS may have only limited knowledge of the states of other DCS elements, a decentralized scheme is needed to validate the actions of the CEs. For autonomous operation, each DCS element must be able to relate its actions or changes of state to a subset of the process state. If individual sensors and actuators comprise Control Elements of the DCS, then each sensor and actuator must autonomously determine whether its current state is in agreement with a subset of the preceding states and actuations of the system.

The present invention comprises a control system that augments traditional Boolean Logic Control (BLC). The system can be incorporated into existing Programmable Logic Controllers (PLCs) to provide fail-safe control with enhanced diagnostics. The control method is especially suited for monitoring and controlling dynamic systems that have distributed discrete-value sensors and actuators.

There are two types of CEs in a discrete-event manufacturing system: those that change state randomly (e.g., operator controlled actions such as E-stop and Halt commands) and those that are deterministic with a sequential (and sometimes temporal) model relating their state changes. The latter, referred to as Constrained Events, may change state randomly in time, but they occur in a deterministic sequence. The state changes of most sensors and actuators in a discrete manufacturing line, for example, are usually Constrained Events produced by a predictable flow of materials or parts. In the present invention, the sequential relationships of Constrained DCS events are encoded into the system as control element signatures.

Figure 1:
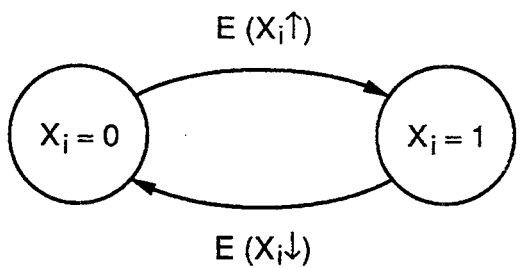
FIG. 1 is a block diagram illustrating the two possible state changes for a binary Control Element (CE)

FIG. 1 illustrates a simple two state model of a Control Element, $CE_i$. Given the current state of a DCS, the present invention generates a model that predicts the occurrence of an event that causes a state change. The expectation of state $X_i=0$ to change to state $X_i=1$ may be written as $E(X_i \uparrow)$, and expectation of state $X_i=1$ to change to state $X_i=0$ may be written as $E(X_i \downarrow)$. The expectation function E can have a continuum of values between 0 and 1, although the evolution of E over time may not be continuous.

Figure 2:
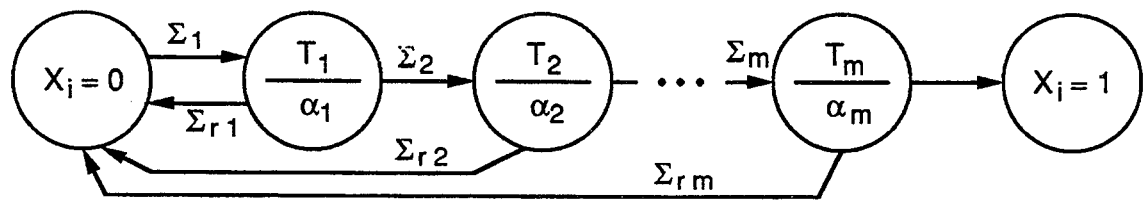
FIG. 2 is a block of a sequence function that comprises a Control Element signature utilized by the present invention.

$\Gamma$ ($\Sigma_1, \Sigma_2, \ldots \Sigma_m$) defines a sequence function that represents the occurrence of events $\Gamma$ Z in the strict sequence $\Gamma_1, \Gamma_2, \ldots \Gamma_m$. The sequence function $\Gamma$ can be modeled by a state machine as illustrated schematically in FIG. 2. As each event $\Gamma_i$ in the sequence gives, the machine transitions to a new state $T_i$. A reset event labeled $\Gamma_{ri}$ can be defined in any state to reset the sequence function $\Gamma$. Each transitional state $T_i$ in the sequence function has a value $\alpha_i$ such as $\alpha_1, \alpha_2, \ldots \alpha_m$ (where $\alpha_m$ generally equals 1). Typically, these state values $\alpha_i$ are defined by the operator of the controlled system. When all the transitional states have changed in sequence without being reset, the expectation that $CE_i$ will change from state $X_i=0$ to state $X_i=1$ is essentially 1. The sequence function associated with each control element thus defines a "signature" for that CE.

$\Phi$ ($\Sigma_1, \Sigma_2, \ldots \Sigma_m$) defines a random function that represents the random occurrence of events $\Sigma_l, \Sigma_2, \ldots \Sigma_m$. This function returns a value of 1 when all the events $\Sigma_l, \Sigma_2, \ldots \Sigma_m$ have occurred. When the first event $\Sigma_i$ arrives, the random function $\Phi$ returns a value of 1/m. When the second event arrives, it returns the value 2/m, and so on. A reset event $\Sigma_r$ can also be defined for the random function $\Phi$.

The expectation function E of a control element to change state, from 0 to 1 for example, may be defined as a function of $\Gamma$ and $\Phi$ as follows:

$$E(X_i \downarrow) = f(\Gamma, \Phi),$$

where f is defined as any combination of sequences and random events. An example of f is:

$$f = \Gamma(\Sigma_1, \Sigma_2, \Phi(\Sigma_3, \Sigma_4, \ldots \Sigma_r), \Sigma_j, \Sigma_k, \ldots).$$

Sequence function $\Gamma$ can be represented as a vector of sequence functions. The expectation function E for n states of X is defined as the product of an ordered set of events and predefined weights:

$$E(X) = [\alpha_1 \bullet \Gamma_1, \alpha_2 \bullet \Gamma_2, \ldots \alpha_n \bullet \Gamma_n]^T,$$

where "$\alpha_i$" is an n-dimensional vector of weighting constants, "$\bullet$" denotes the vector dot product, and "T" denotes vector transpose. Each element of the vector expectation function E represents one path of evolution of the events. If the process has a single unique path, then E is a scalar rather than a vector.

Figure 3:
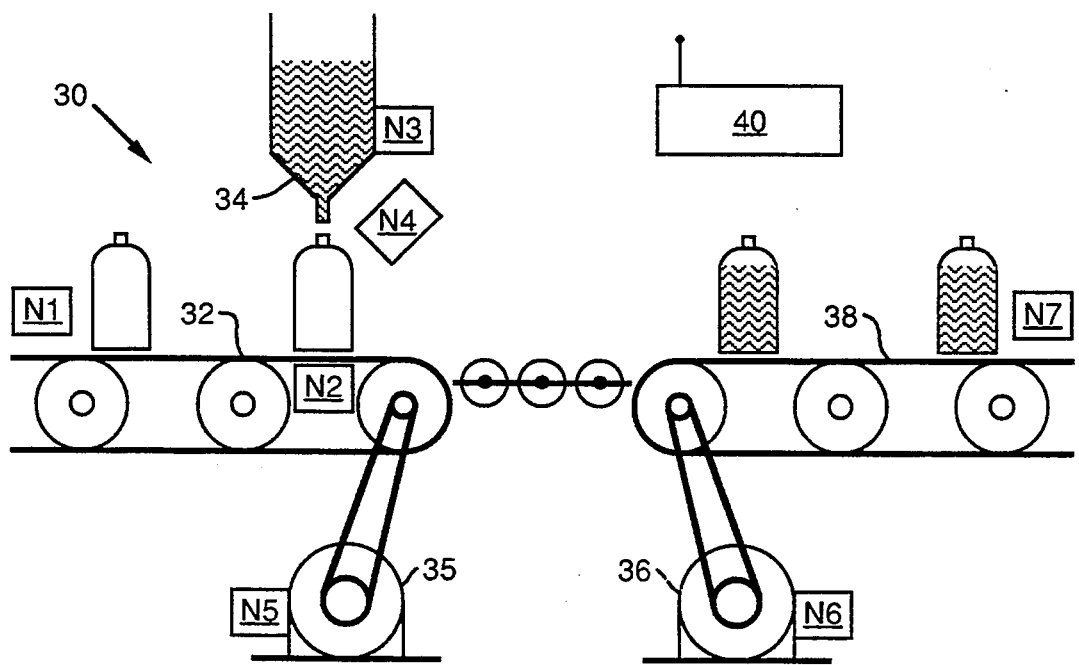
FIG. 3 is a schematic diagram of a bottle filling line using a control system of the present invention.

To illustrate operation of the expectation functions of the present invention, FIG. 3 depicts an example of a bottle filling line 30. In FIG. 3, N1, N2, ... N7 denote distributed processing nodes. Each node comprises a control element (either a sensor or an actuator), and each control element generally includes a dedicated microprocessor. The microprocessor for each control element functions to time-stamp state changes; encode the sequence function, random function, and temporal model; compute the expectation function and the state delay estimate; and predict and evaluate control element state changes. In the example of FIG. 3, N1 is a sensor for detecting empty bottles on an input conveyor 32; N2 is a load sensor at a filling station; N3 is a solenoid actuator for a fluid injector 34; N4 is a fill level photodetector; N5 is an actuator for an input drive motor 35; N6 is an actuator for an output drive motor 36; and N7 is a sensor for detecting filled bottles on an output conveyor 38. The microprocessor of each control element is connected by a communication link 40 to at least the other control elements in its "neighborhood" (i.e., those other elements that define the signature for that control element). Communication link 40 may comprise hard wiring between nodes N1–N7, for example, or a radio transceiver as illustrated. The expectation function for sensor N4 to change state from off (0) to on (1), for example, may be stated as follows.

$$E(N4 \uparrow) = \Gamma(N2 \uparrow, N5 \downarrow, N3 \uparrow)$$

where the up arrows denote a transition from 0 to 1 and the down arrows denote a transition from 1 to 0. The expectation function $E(N4 \uparrow)$ goes from 0 to 1 in three discrete steps as the three elements of sequence function $\Gamma$ (i.e., the signature for N4) occur in sequence and return a value of 1. Thus, the microprocessor of photodetector N4 is connected to at least nodes N2, N3, and N5, which define the signature for detector N4. A large number of elements in sequence function $\Gamma$ yields a smooth expectation function.

The expectation function $E(X_i\uparrow)$, defined by a sequence function $\Gamma$, is evaluated as follows:

$$E(X_i\uparrow)=\Gamma(\Sigma_1, \Sigma_2, \ldots \Sigma_m)=\alpha_1 E(\Sigma_1+\alpha_2 E(\Sigma_2)|_{\Sigma_1} + \ldots +\alpha_m E(\Sigma_m)|_{\Sigma_1,\Sigma_2,\ldots \Sigma_{m-1}}$$

where $\alpha_i$ is a coefficient that represents the probability (p) of $X_i$ changing state from 0 to 1, that is:

$$\alpha_i = p(X_i\uparrow)|\Gamma_{\Sigma_1, \Sigma_2, \ldots \Sigma_i} \text{ for } i \leq m, \text{ and where}$$

$$E(\Sigma_i)|\Sigma_{i-1} = 0 \text{ before } \Sigma_{i-1} \text{ occurs, and}$$
$$= E(\Sigma_i) \text{ after } \Sigma_{i-1} \text{ occurs.}$$

The coefficients $\alpha_1, \alpha_2, \ldots \alpha_m$ generally form an ascending sequence with $\alpha_m = 1$. The expectation function $E(X_i\uparrow)$ becomes zero when $X_i=1$.

To further illustrate evaluation of expectation functions, the expectation function defined above in conjunction with bottle filling line 30 illustrated in FIG. 3 can be rewritten as follows:

$$E(N4\uparrow)=0.2\ E(N2\uparrow)+0.5\ E(N5\downarrow)|_{N2\uparrow}+1.0\ E(N3\uparrow)|_{N2\uparrow,N5\downarrow}$$

where 0.2, 0.5, and 1.0 are qualitatively determined weights corresponding to $\alpha_i$ above.

The present invention also utilizes a temporal model for the decentralized control method. The model assumes that state transitions are instantaneous but that a pure delay time D occurs within states. Delay time D is a random variable that is related to perturbations caused by delays and buffers in workstations and transport devices of a manufacturing line, for example. The objective of the temporal model is to generate an estimate $D_n'(X_{i0})$ of the delay $D_n$ in state $X_{i0}$ before transitioning to state $X_{i1}$, where n denotes the sampling instant. The delay estimate can be modeled as a function of the preceding delay and the delays in the states associated with events in the signature of the control element as follows:

$$D_n'(X_{i0})=D_{n-1}(X_{i0})+G[\Delta D_n'(\Sigma_1, \Sigma_2, \ldots \Sigma_m)]^T$$

where G is a vector of unknown constants to be determined, $\Delta D_n'(\Sigma_1, \Sigma_2, \ldots \Sigma_m)$ is a vector of dimension m containing estimation errors in the time delays of states corresponding to events $\Sigma_1, \Sigma_2, \ldots \Sigma_m$, T denotes vector transpose, and n denotes the sampling instant. In the estimation process, the following quadratic function is minimized:

$$\text{minimize: } [D_n(X_{i0})-D_n'(X_{i0})]^2.$$

Substitution of $D_{n'}(X_{i0})$ from the equation above yields:

$$\text{minimize: } [D_n(X_{i0})-D_{n-1}(X_{i0})+G[\Delta D_n'(\Sigma_1, \Sigma_2, \ldots \Sigma_m)]^T]^2.$$

And since $$\Delta D_n(X_{i0})=D_n(X_{i0})-D_{n-1}(X_{i0}),$$

the minimum for the above expression is obtained when:

$$G[\Delta D_n'(\Sigma_1, \Sigma_2, \ldots \Sigma_m)]^T=\Delta D_n(X_{i0}),$$

which can be solved by a standard least squares method following on-line data collection of m samples.

An alternative, preferred solution utilizes a prior knowledge of the behavior of the discrete event system being controlled. In this solution, $\rho_{ik}(n)$ denotes the autocorrelation coefficient between $\Delta D_n(X_{i0})$ and $\Delta D_n(\Sigma_i, \Sigma_2, \ldots \Sigma_m)$ at the sampling instant n, and is defined as:

$$\rho_{ik}(n)=\text{cov }[\Delta D_n(X_{i0}), \Delta D_n(\Sigma_k)]/(\sigma_i\sigma_k),$$

where $\sigma_i$ and $\sigma_k$ are standard deviations of $\Delta D_n(X_{i0})$ and $\Delta D_n(\Sigma_k)$, respectively, and "cov" denotes the covariance. Therefore, vector G may be factored as:

$$G=K\rho,$$

where K is a constant and $\rho$ is the vector of autocorrelation functions defined above. At each sampling instant, $K_n$ is determined by the following equation:

$$K_n = \frac{\rho_{i1}\Delta D_{\Sigma 1} + \rho_{i2}\Delta D_{\Sigma 2} + \ldots + \rho_{im}\Delta D_{\Sigma m}}{\Delta D_n(X_{i0})}$$

The equation for the delay estimate can then be written as:

$$D_n'(X_{i0})=D_{n-1}(X_{i0})+K_{n-1}\rho_n[\Delta D_n\Sigma_i, \Sigma_2, \ldots \Sigma_m)]^T.$$

To illustrate application of the foregoing timing model, consider the bottle filling example of FIG. 3. As previously stated, the expectation function for sensor N4 to change state from off (0) to on (1) may be defined as:

$$E(N4\uparrow)=\Gamma(N2\uparrow, N5\downarrow, N3\uparrow).$$

The equation expressing the timing model for the time delay in state N4=0 can be written as:

$$D_n'(N4_0)=D_{n-1}(N4_0)+K_{1\rho 1}\Delta D(N2_0)+K_{2\rho 2}\Delta D(N5_1)+K_{3\rho 3}\Delta D(N3_0),$$

The value of the autocorrelation coefficients $K_{i\rho i}$ ranges between 0 and 1 as a function of the degree of linear correlation between the delay in state N4=0 and the delays in the states N2=0, N5=1, and N3=0. In this example, the delay in N4=0 may correlate linearly to the delay N3=0. If the fill speed reduces due to partial blockage of the fill valve, the timing model will identify this additional delay. The delay can be automatically identified and reported to the operator if the fill speed goes below a prespecified threshold. In addition, the failure of N4 can be identified by a combination of the sequential behavior model (i.e., the event signature) and the timing model by checking if the event signature of N4 to change state from 0 to 1 is satisfied and the time delay in N4=0 exceeds the estimated delay.

As described for the example of FIG. 3, the combination of a behavior model and a temporal model gives the control system of the present invention the capability of diagnosing failures and malfunctions in the sensors and actuators. Furthermore, the system can identify transient errors such as N4 changing state out of sequence due to reflected light or changes in environmental lighting conditions, for example. The identification of transient errors such as these is extremely difficult, if not impossible, using conventional control methods.

As described above, the present invention comprises a control system that augments conventional Boolean Logic Control (BLC) to provide fail-safe control with enhanced diagnostics. The method can be incorporated into present Programmable Logic Controllers and is particularly applicable to distributed or decentralized control systems, which are the current trend in automated factory control. The primary differences between the present invention and conventional BLC or state-machine logic systems may be summarized as follows:

1. The present invention models each sensor and actuator as an independent Control Element (CE) and assigns a simple behavioral model to each CE. In prior art BLC systems, logic is associated only with actuators.
2. The present system is based on a distributed model of the logical and temporal behavior of the controlled process. The behavioral model for each sensor and actuator comprises a "signature" of events in its immediate environment. The signature encodes a subset of the process state into each CE and is used to check the behavior of each CE against that subset of the process state. Each binary CE has two states: 0 and 1. The signature of each CE is specified by a sequence of state changes, which may be ordered and/or random.
3. The present invention provides a time-stamp of events in order to construct the sequence of events.
4. The invention utilizes Expectation Functions (EFs) to quantitatively evaluate and predict the change of state of any CE in the controlled system.
5. Each CE generates an internal statistical timing model of the state transitions in its neighborhood. As confidence develops in these statistics, they may be used for monitoring and diagnosis of the controlled system. The statistical timing model may also be used to change the timing between states for line scheduling of the controlled system.

Although the present invention has been described with respect to specific embodiments thereof, various changes and modifications can be carried out by those skilled in the an without departing from the scope of the invention. Therefore, it is intended that the present invention encompass such changes and modifications as fall within the scope of the appended claims.

I claim:

1. A decentralized system for monitoring and controlling a dynamic process, comprising:
   a plurality of distributed control elements, each of said control elements having at least two states;
   a communication link connecting at least selected ones of said control elements; and
   a plurality of microprocessors corresponding to said plurality of control elements, each of said microprocessors dedicated to a corresponding one of said control elements for time-stamping state changes of said one control element; communicating said time-stamped state changes to selected others of said control elements; storing a sequence function associated with said one control element, said sequence function comprising a sequence of at least one other control element state change defining an event signature for said one control element to change state; computing an expectation function for determining a likelihood of said one control element to change state, said expectation function computed from said sequence function; and evaluating state changes to identify malfunctions of said one control element based on said state change likelihoods determined by said expectation function.

2. The control system of claim 1, wherein each of said microprocessors is further dedicated to said corresponding one of said control elements for estimating a time delay before each state change in said sequence of control element state changes defining said event signature for said one control element.

3. The control system of claim 2, wherein said distributed control elements comprise sensors and actuators.

4. A method of monitoring and controlling a decentralized system having a plurality of distributed control elements, comprising the steps of:
   providing each of said control elements with a dedicated microprocessor, each of said control elements having at least two states;
   connecting selected ones of said dedicated microprocessors with a communication link;
   time-stamping state changes of each of said plurality of control elements;
   communicating said time-stamped state changes of each of said control elements to selected others of said dedicated microprocessors connected by said communication link;
   providing a plurality of sequence functions, each of said sequence functions associated with a corresponding one of said control elements and comprising a sequence of at least one other control element state change defining an event signature for said one of said control elements;
   generating a plurality of expectation functions for determining likelihoods for each of said control elements to change state, each of said expectation functions computed from a corresponding one of said sequence functions; and
   evaluating control element state changes to identify state change errors based on said state change likelihoods determined by said expectation functions.

5. The method of claim 4, further comprising the step of estimating a time delay before each state change in said sequence functions defining said event signatures of said control elements.

6. The method of claim 5, further comprising the step of defining each of said event signatures based on a specified sequence of state changes of control elements connected by said communication link.

7. A method of monitoring and controlling a decentralized system having a plurality of distributed control elements including sensors and actuators, comprising the steps of:
   providing a plurality of microprocessors, each of said microprocessors connected to at least one of said control elements, each of said control elements having at least two states;
   connecting at least selected ones of said microprocessors with a communication link;
   monitoring and time-stamping state changes of said plurality of control elements;
   communicating said time-stamped state changes of each of said control elements to selected ones of said microprocessors connected by said communication link;
   providing a behavioral model for each of said control elements, each of said behavioral models comprising a specified sequence of control element state changes forming an event signature for a specified one of said control elements to change state;
   providing a temporal model for each of said control elements, each of said temporal models comprising a time delay estimate for a specified change of state of one of said control elements;

generating a plurality of expectation functions for determining likelihoods of said control elements to change state, each of said expectation functions derived from a corresponding one of said event signatures; and evaluating control element state changes and identifying state change errors based on said state change likelihoods determined by said expectation functions.

8. The method of claim 7, wherein the step of providing a temporal model for each of said control elements further comprises statistically determining said time delay estimate for each state change of said of control elements.

9. The method of claim 8, further comprising the step of defining each of said event signatures based on said specified sequence of state changes for predetermined ones of said of control elements having said microprocessors connected by said communication link.

10. The method of claim 9, wherein the step of defining said event signatures further comprises the step of defining subsets of the decentralized system for encoding as said event signatures for said control elements.

* * * * *